(12) United States Patent
Eriksson

(10) Patent No.: US 9,410,749 B2
(45) Date of Patent: Aug. 9, 2016

(54) HEAT EXCHANGER ELEMENT

(75) Inventor: Per Gunnar Eriksson, Vilhelmina (SE)

(73) Assignee: JLO INVEST AB, Umeå (SE)

( * ) Notice: Subject to any disclaimer, the term of this patent is extended or adjusted under 35 U.S.C. 154(b) by 610 days.

(21) Appl. No.: 13/121,635

(22) PCT Filed: Sep. 22, 2009

(86) PCT No.: PCT/SE2009/051051
§ 371 (c)(1),
(2), (4) Date: Jun. 1, 2011

(87) PCT Pub. No.: WO2010/039089
PCT Pub. Date: Apr. 8, 2010

(65) Prior Publication Data
US 2011/0220340 A1   Sep. 15, 2011

(30) Foreign Application Priority Data
Sep. 30, 2008 (SE) .................................. 0802068

(51) Int. Cl.
| F28F 3/14 | (2006.01) |
| F28F 7/00 | (2006.01) |
| F28F 3/08 | (2006.01) |
| F28F 3/12 | (2006.01) |
| F24J 2/20 | (2006.01) |
| F28F 9/02 | (2006.01) |
| F28F 21/06 | (2006.01) |
| F24J 3/08 | (2006.01) |

(52) U.S. Cl.
CPC . *F28F 3/12* (2013.01); *F24J 2/201* (2013.01); *F24J 2/204* (2013.01); *F28F 9/0258* (2013.01); *F28F 21/065* (2013.01); *F24J 3/081* (2013.01); *Y02B 10/20* (2013.01); *Y02E 10/12* (2013.01); *Y02E 10/44* (2013.01); *Y02P 80/24* (2015.11)

(58) Field of Classification Search
CPC .......... F28F 3/044; F28F 21/065; F28F 7/02; F28F 3/12; F28F 3/14; F28D 1/0308; F24F 5/0046; H01L 23/473
USPC ........................................ 165/167, 170, 80.4
See application file for complete search history.

(56) References Cited

U.S. PATENT DOCUMENTS 2,781,645 A * 2/1957 Simmons ........................ 62/515
4,235,281 A * 11/1980 Fitch et al. ..................... 165/115
4,243,020 A   1/1981 Mier
(Continued)

OTHER PUBLICATIONS

International Search Report received for PCT Patent Application No. PCT/SE2009/051051, mailed on Jan. 28, 2010, 5 pages.
(Continued)

*Primary Examiner* — Allen Flanigan
*Assistant Examiner* — Jason Thompson
(74) *Attorney, Agent, or Firm* — Morrison & Foerster LLP

(57) ABSTRACT

The invention relates to an heat exchanger element of a plate type, with one internal flow passage, comprising two plates defining an inlet, an outlet and an internal passage extending between said inlet and said outlet, whereas said passage is between two generally parallel plates of self supporting polymer material. The present invention also relates to the use of such an exchanger element as collector in a solar energy arrangement, as chilled beam, as hear distributing element, as subterranean collector, as exchange element in industrial processes and as heat absorber in arrangements for cooling electrical components that are negatively affected by being close to elements having electrical conductivity.

17 Claims, 3 Drawing Sheets

(56) References Cited

U.S. PATENT DOCUMENTS

| | | | |
|---|---|---|---|
| 4,290,413 A * | 9/1981 | Goodman et al. | 126/624 |
| 4,378,046 A * | 3/1983 | Klinger | 165/51 |
| 4,625,794 A | 12/1986 | Durst | |
| 4,763,641 A * | 8/1988 | Smith | 126/672 |
| 4,858,594 A * | 8/1989 | McCurdy | 126/672 |
| 6,340,053 B1 | 1/2002 | Wu et al. | |
| 6,460,614 B1 * | 10/2002 | Hamert et al. | 165/170 |
| 7,083,755 B2 * | 8/2006 | Drummond et al. | 264/311 |
| 7,232,457 B2 * | 6/2007 | Schmidt et al. | 607/96 |
| 7,549,463 B1 * | 6/2009 | Schmeler | C21B 7/10 165/168 |
| 2002/0011330 A1 * | 1/2002 | Insley et al. | 165/133 |
| 2003/0192682 A1 | 10/2003 | Lowenstein et al. | |
| 2004/0248492 A1 * | 12/2004 | Baker, Jr. | 442/381 |
| 2006/0000578 A1 * | 1/2006 | Kang et al. | 165/56 |
| 2006/0090886 A1 * | 5/2006 | Kamiyama | B60H 1/0055 165/140 |
| 2008/0149318 A1 * | 6/2008 | Dakhoul | F28F 3/086 165/167 |
| 2008/0277096 A1 * | 11/2008 | Vilmart et al. | 165/104.11 |

OTHER PUBLICATIONS

International Preliminary Report on Patentability received for PCT Patent Application No. PCT/SE2009/051051, mailed on Apr. 14, 2011, 6 pages.

International Written Opinion received for PCT Patent Application No. PCT/SE2009/051051, mailed on Jan. 28, 2010, 4 pages.

* cited by examiner

HEAT EXCHANGER ELEMENT

CROSS REFERENCE TO RELATED APPLICATIONS

This application is a U.S. National Phase patent application of PCT/SE2009/051051, filed Sep. 22, 2009, which claims priority to Swedish patent application Serial No. 0802068-7, filed Sep. 30, 2008, all of which are hereby incorporated by reference in the present disclosure in their entirety.

FIELD OF THE INVENTION

The present invention relates to a heat exchanger element of a plate type with one internal flow passage comprising two plates defining an inlet, an outlet and an internal flow passage that extends between said inlet and said outlet.

The present invention also relates to a number of uses of such an element.

BACKGROUND OF THE INVENTION

Heat exchanger elements of a plate type are well known and typically made of metal. The production cost for such elements are relatively high, depending on the price of relevant metals and time required for the production, comprising cutting, forming and welding/brazing. In use, metal based elements are relatively heavy and have a high electrical conductivity which can be negative in some situations. They are also stiff and easily defected if exposed to bending or shock forces.

A heat exchange element has also been presented that is produced from a rubber based materials, but such elements are flexible and therefore not suited for applications where stability in shape and volume is required.

OBJECT AND SUMMARY OF THE INVENTION

It is therefore an object of the present invention to provide a heat exchanger element that solves or at least alleviates to some extent the abovementioned problems or challenges. This object is achieved by the present invention as it is defined in the attached independent claims.

Another object is to introduce a number of uses of such a heat exchange element.

This is achieved by a heat exchanger element of a plate type with one internal flow passage, comprising two plates defining an inlet, an outlet and an internal passage extending between said inlet and said outlet, whereas said passage is defined between two generally parallel plates of a self-supporting polymer material. Herewith a non corrosive heat exchanger element can be produced in a cost effective way in an industrialised processes. A polymer material is easy to form and join and is form stable but also allows some flexing, making it tolerant to bending and shock forces. Hereby, e.g. the element can be placed horizontally and suspended only at its edges.

In one embodiment at least on of said plates is of a non-conductive material. In this way, the heat exchanger element can be used in situations and places where spark over, shortcut or other electrical phenomena need to be avoided.

In one embodiment at least one plate can show a pattern configuring the passage. In an alternative embodiment one plate can show a pattern configuring the passage and the other plate is plane.

In one embodiment the plates can be bound to each other by means of joints that show homogeneous material or with joints having the same molecular structure as the plate material surrounding the joints, hereby reducing the risk of fluctuating temperatures negatively affecting the joints.

In one embodiment the joints between the plates can have the same material thickness as the plate's thickness between the joints.

In one embodiment the polymer material can be from a group of thermoplastic materials comprising e.g. ABS-plastics, polycarbonate plastics, polypropene, etc.

In one embodiment the plates in the element can comprise layers building up the characteristics of the specific plate. In one embodiment the two plates can have different material characteristics. Examples of such characteristics can be UV-resistance, impact resistance and defined hygiene characteristics to be allowed for use in food or pharmaceutical applications as well as resistivity.

In one embodiment a plurality of spot joints can be arranged between the plates and distributed over the passage area. Dimples can be arranged in at least one of the plates. These spot joints contribute to the stability of the element, both with regard to resistance against bending and, when asserted to internal pressure, with regard to resistance against change in volume. This additional strength also makes it possible in some applications to use the element as a load carrying component in a structure.

In one embodiment of the present invention, the inlet and the outlet opening respectively, can be provided with a connector arrangement.

The present invention also concerns the use of a heat exchanger element, as described above, as absorber in a solar energy arrangement for the heating of water or other fluids.

The present invention also concerns the use of a heat exchanger element, as described above, as a chilled beam in an arrangement to be used for lowering the temperature in a building, where the element can be positioned at ceilings, walls, pillars, stand-alone or in floors.

The present invention also concerns the use of a heat exchanger element, as described above, as heat distributing element in an arrangement to be used for rising the temperature in a building, where the element can be positioned at ceilings, walls, pillars, stand-alone or in floors.

The present invention also concerns the use of a heat exchanger element, as described above, as a subterranean collector element in a ground energy system. Here the ability to maintaining the internal passage and at the same time accept some flexing without plastic deformation or cracks, makes is possible for such an element to sustain normal ground movements and forces.

The present invention also concerns the use of a heat exchanger element, as described above, as heat exchanger element in industrial processes and food production applications. There are a number of polymer materials approved for use in e.g. food production and some of them are also possible to use in a heat exchange element according to the present invention.

The present invention also concerns the use of a heat exchanger element, as described above, as heat absorber in a temperature regulating arrangement for cooling electrical components that are negatively affected by being close to or abutting elements having electrical conductivity.

The present invention will be explained in more detail hereinafter on the basis of a detailed description of embodiments of the invention, which embodiments are meant solely as examples. In the following description thereof, reference is made to the appended figures, in which:

DESCRIPTION OF EMBODIMENTS

Figure 1:
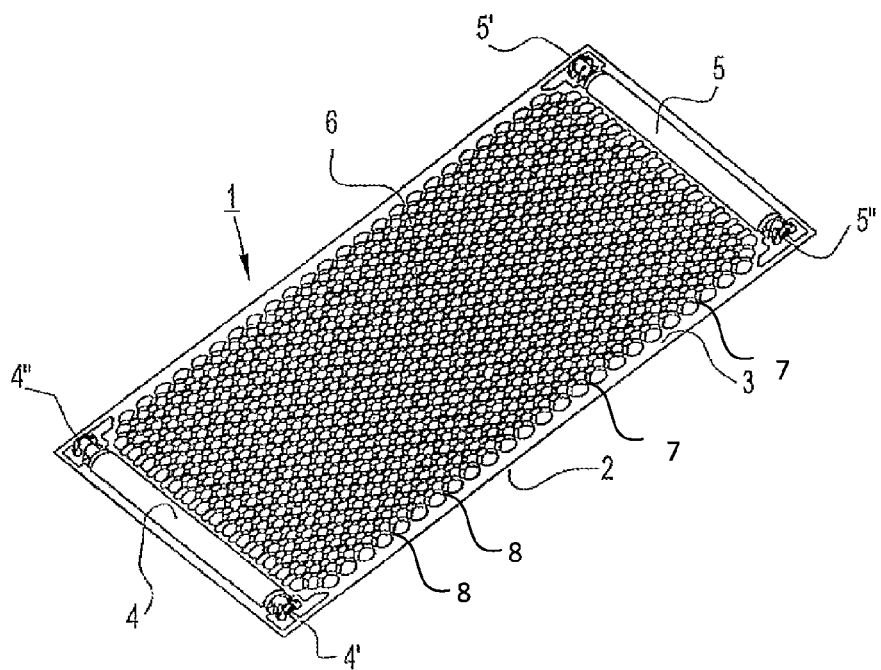
FIG. 1 schematically shows a perspective view of an element according to a first embodiment of the present invention.
Figure 2:
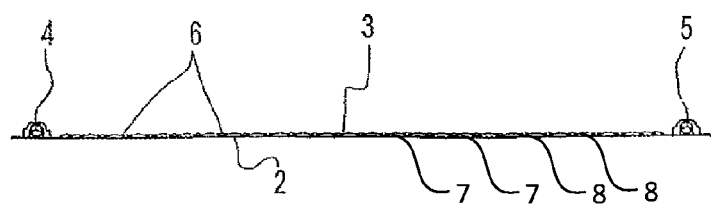
FIG. 2 schematically shows a side view of the element in FIG. 1

In FIGS. 1 and 2, a first embodiment of a heat exchange element 1 according to the present invention is schematically depicted. The element 1 has a first rectangular plate 2 that is plane and a second rectangular plate 3 showing a pattern that, together with said first plate 1 when joined, defines an inlet channel 4 and an outlet channel 5 and a passage 6 extending between said inlet and said outlet.

The two rectangular plates are made of a 1 mm thick thermoplastic material, an ABS. The most important mechanical properties of ABS are resistance and toughness but a variety of modifications can also be made to improve impact resistance, toughness as well as heat and UV resistance. Still it is a thermoplastic material that can be heated and given a form that it will keep when the temperature is again returned below the point allowing a plastic deformation.

The pattern formed in the second plate 3 can be described as topographic dislocations in one direction from a plane that the plate originally was a part of.

The parts of the second plate 3 that have not been dislocated will stay in their original plane and thus will be able to abut the surface of the first plate 2 when the two plates are in position for joining. In one embodiment, a plurality of spot joints 7 can be arranged between the plates and distributed over the passage area.

The pattern in the second plate 3 can in this embodiment be described as showing two parallel half pipes arranged at opposite edge portions of the rectangular plate and parallel to respective edge. Between said half pipes, a wafer pattern or a number of spherical cap dislocations distributed over the area.

Looking at the element from the patterned side, as in FIG. 1, parts of the first plate 2 is actually visible in the corners of the element. The reason for this is that the corners have been cut away from the second plate 3 so that the half pipe shapes defining the inlet channel 4 and the outlet channel respectively ends at a distance from respective nearby edge. Thus providing space for an attachment means to be placed in each opening 4', 4" 5', 5" and still be inside the outer edges, of the rectangular element.

Further, the inlet channel 4 has an inlet opening 4' through which a fluid can be feed. The inlet channel 4 is provided with a number of apertures along its extension allowing the fluid to enter into the passage pattern 6. The opening 4" at the opposite side of the inlet channel 4 may either be plugged, if only one element is to be used in the system, or may be connected to the inlet of the next element, if another element is to be used in the system.

The outlet channel 5 is provided with a number of apertures along its extension allowing the fluid from the channels in the passage pattern 6 to enter into the outlet channel 5, for further delivery from the element through the outlet opening 5'. The opening 5" at the opposite side of the outlet channel 5 may either be plugged, if only one element is to be used in the system, or may be connected to the outlet of a previous element, if another element is used in parallel in the system.

The inlet channel and the outlet channel both can act as flow through channels, besides their respective functions as spreading of fluid across the entire width of the patterned passage and receiving/collecting fluid from the patterned passage.

In producing the element, the second plate 3 is heated up and given its intended form before it is brought against the first plate 2 in their intended relative positions. Thereafter the contact surfaces between the two plates are heated up and pressed against each other to form a homogenous joint 8 between the two with no additional material added in the joints.

In a further embodiment of the present invention, attachment means are positioned in the respective openings at both ends of the inlet channel and the outlet channel.

Figure 3:
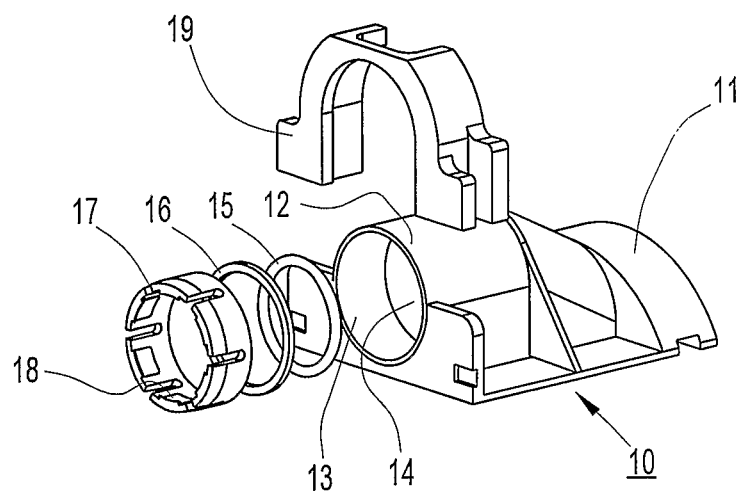
FIG. 3 schematically shows an exploded perspective view of an attachment arrangement used in one embodiment.
Figure 4:
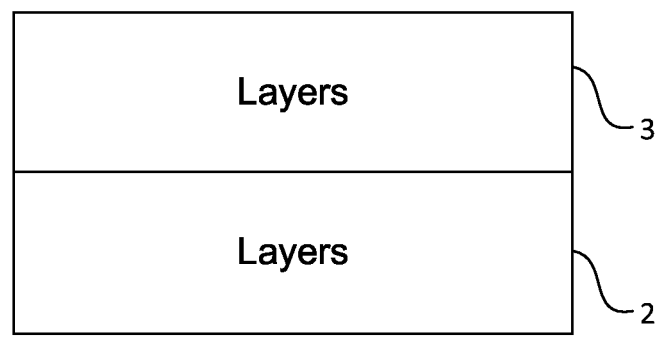
FIG. 4 schematically shows a heat exchange element having plates 2, 3 with layers.

With reference to FIG. 3, the attachment means according to the present embodiment are in the form of quick couplings for tool free connection of a pipe, tube or hose. The coupling comprise a housing 10 having first insertion part 11, that shows a through hole and an outside that is complementary designed in relation to the opening in which it is intended to be used. Here the inlet channel and the outlet channel both have the same symmetric inner shape at their respective openings, thus one housing configuration can be used for all four openings. The insertion part 11 is intended to be received by the respective channel. Preferably the housing is produced in the same material as the plates, hereby the fixating of the housing to the element can be done by applying heat and pressure and without additional material being provided. Also the housing can be fixated using adhesives, welding or other suitable fixating means or methods.

The housing 10 further comprise a receiving portion 12 arranged to receive the object to which it is to be attached. The receiving portion 12 comprises a cylindrical bore 13 connected to said through hole and having a countersunk collar 14. The receiving portion 12 is arranged to interact with a sealing device in the form of a O-ring 15 arranged to be asserted against said countersunk collar 14, a plane washer 16 arranged to be asserted against the O-ring 15 and a pipe/tube/hose gripping means in the form of a ring 17 provided on the inside with internal barbs 18. The ring 17 is intended to assert the plane washer and the barbs 18 are intended to grip a pipe/tube/hose inserted through the ring 17. Finally a releasable locking means 19 are realisably holding the gripping means/ring 17 in position, by preventing it from returning out of the cylindrical bore 13. The locking means 19 is here a pivotable clamp.

Hereby, if the O-ring 15, the plane washer 16 and the ring 17 is in place and locked with the locking means 19; a tube can be inserted through the ring 17, the plane washer 16 and through the tightening O-ring 15 until the tube abuts the countersunk collar 14. The barbs will prevent the tube from come loose, even when the system gets pressurized. If the locking means 19 is opened, the tube can be removed from the coupling.

If a cylinder is inserted instead of a tube, the opening will be plugged. Other objects can also be used that fits in the attachment means and is preventing fluid passage.

Further in one embodiment, the passage pattern provide a maximum height, the maximum distance between the inside surfaces of the two plates measured in a direction that is orthogonal to a plane that is generally parallel to the two plates, that is less then $1/5$ of its width or extension in a plane generally parallel to the two plates. In one alternative embodiment the height is less then $1/10$ of its width.

The element described above can be used as absorber element in an arrangement for collecting heat from solar energy. For this relatively larger carbon content is chosen in the polymer material to make the collector black. Such systems have a fluid, e.g. water, which passes through the element and gets heated by the solar energy. Then it continues to some kind of use of that heated fluid. Such use can be direct use of hot water or indirect use through a heat exchanger means. To improve efficiency, the element can be placed on an insulating bed in a box with a transparent lid. To fasten the element, the element can be clamped at its edges or the element can be provided with fastening holes through its main surface, given that the edges delimiting said holes are sealed. The self-supporting characteristics of the element make it possible to hang the element on a wall or place in on a roof without extra supporting structures.

The element described above can also be used as chilled beam element in a system to lower the temperature in a building using circulating cooling fluids. The thermoplastic material can be given different colours and shapes besides being relatively low-weighted.

If a building is provided with a heating system based on the circulation of warm fluids, the element described above can also be used as heat distributing element in such a circulating fluid system.

Another use of the element described above, is as subterranean collector element in a ground energy system. Such systems usually collect heat from the ground using hoses on frost proof depth, e.g. in gardens, or submerge to frost proof depth in some water, e.g. a lake. Compared to hoses, the element according to this invention can collect the same amount of energy on a smaller surface area. Compared to plate type elements of metal, the element according to this invention will have better possibility to survive the movements in the ground because of the material features accepts some flexing without generating plastic deformation or cracks.

In still another use of the element described above, the element is used as heat exchanger element in industrial processes or food production processes. In the latter the hygiene aspects is important and there are thermoplastic materials that are approved for such use and are possible to use in the plates when producing an element according to this invention.

The element as described above can also be used for cooling electrical components that are negatively affected by being close to or abutting elements having electrical conductivity. Examples of such components are components dealing with sending and receiving radio waves, radio frequency circuits and solar cells. If a high resistivity is desired e.g. in ABS material, small or excluded carbon content is chosen and a quality that don't absorb moist. A non-conductive material can e.g. have a resistivity above $1\times10^6$ Ωm, preferably above $1\times10^8$ Ωm, more preferably above $1\times10^{10}$ Ωm and most preferably above $1\times10^{13}$ Ωm.

The word "comprising" does not exclude the presence of elements or steps other than those listed in a claim. The word "a" or "an" preceding an element does not exclude the presence of a plurality of such elements.

The invention claimed is:

1. Heat exchanger element of a plate type, comprising:
   two plates bound to each other with joints having a material structure derived from a plate material surrounding the joints,
   wherein:
   the plates comprise a self-supporting polymer material and at least one plate comprises a plurality of layers,
   one plate has at least one different material characteristic than the other plate selected from the group consisting of UV-resistance, impact resistance, electrical conductivity, and resistivity,
   the plates define an inlet, an outlet, and an internal passage extending between said inlet and said outlet, wherein said passage is defined between the two plates,
   longitudinal ends of the inlet and the outlet are confined within a contour of the plates in a plane in which the plates extend,
   the inlet and the outlet are of a shape of a half pipe, and
   one of the two plates has a cutout at each one of the longitudinal ends of the inlet and the outlet that is offset from each peripheral edge of the one of the two plates and that is shaped to receive therein a complementary-shaped attachment member configured to be connected to an external pipe, and so that the other of the two plates is exposed through the cutout.

2. Heat exchanger element according to claim 1, wherein at least one of said plates comprises non-conducting material.

3. Heat exchanger element according to claim 1, wherein at least one plate shows a pattern configuring the passage.

4. Heat exchanger element according to claim 1, wherein one plate shows a pattern configuring the passage and the other plate is planar and does not show a pattern configuring the passage.

5. Heat exchanger element according to claim 1, wherein the joints between the plates have the same material thickness as the plates.

6. Heat exchanger element according to claim 1, wherein the polymer material is a thermoplastic material.

7. Use of a heat exchanger element according to claim 1, wherein the heat exchanger operates as an absorber in a solar energy arrangement for the heating of water or other fluids.

8. Use of a heat exchanger element according to claim 1, wherein the heat exchanger is operated as a chilled beam in an arrangement to be used for lowering the temperature in a building.

9. Use of a heat exchanger element according to claim 1, wherein the heat exchanger is used as a heat distributing element in an arrangement to be used for rising the temperature in a building.

10. Use of a heat exchanger element according to claim 1, wherein the heat exchanger is used as a subterranean collector element in a ground energy system.

11. Use of a heat exchanger element according to claim 1, wherein the heat exchanger is used as a heat exchanger element in industrial processes and food production applications.

12. Use of a heat exchanger element according to claim 1, wherein the heat exchanger is used as a heat absorber in a temperature regulating arrangement for cooling electrical components that are negatively affected by being close to or abutting elements having electrical conductivity.

13. The heat exchanger of claim 6, wherein the thermoplastic material is selected from the group consisting of ABS, polycarbonate, and polypropene.

14. The heat exchanger of claim 1, wherein the joints are spot joints.

15. The heat exchanger of claim 14, wherein the spot joints are distributed between the plates at locations between the inlet and the outlet.

16. Heat exchanger element of a plate type, comprising:
   two plates bound to each other by a plurality of spot joints between the plates, wherein the plates comprise a self-supporting polymer material, and
   wherein the plates define:
   an inlet having exposed openings at each longitudinal end and a plurality of apertures along a longitudinal direction of the inlet, an outlet having exposed openings at each longitudinal end and a plurality of apertures along a longitudinal direction of the outlet, an internal passage defined between the plates and extending between said inlet and said outlet, and wherein, longitudinal ends of the inlet and the outlet are confined within a contour of the plates in a plane in which the plates extend, the inlet and the outlet are of a shape of a half pipe, and, one of the two plates has a cutout at each one of the longitudinal ends of the inlet and the outlet that is offset from each peripheral edge of the one of the two plates and that is shaped to receive therein a complementary-shaped attachment member configured to be connected to an external pipe, and so that the other of the two plates is exposed through the cutout.

17. Heat exchanger element according to claim 1, further comprising an attachment member disposed at a particular cutout of least one of the longitudinal ends of the inlet and the outlet.

* * * * *